No. 833,890. PATENTED OCT. 23, 1906.
C. S. PADFIELD.
APPARATUS FOR MECHANICALLY MILKING ANIMALS.
APPLICATION FILED SEPT. 10, 1903.

2 SHEETS—SHEET 1.

Witnesses

Inventor
CHRISTOPHER S. PADFIELD
By Vincent Hughes
Attorney

No. 833,890. PATENTED OCT. 23, 1906.
C. S. PADFIELD.
APPARATUS FOR MECHANICALLY MILKING ANIMALS.
APPLICATION FILED SEPT. 10, 1903.
2 SHEETS—SHEET 2.
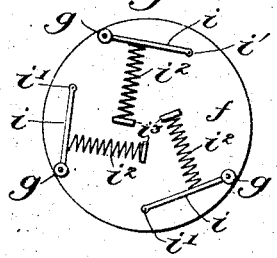
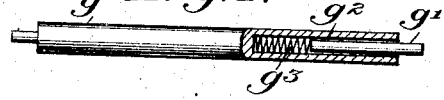
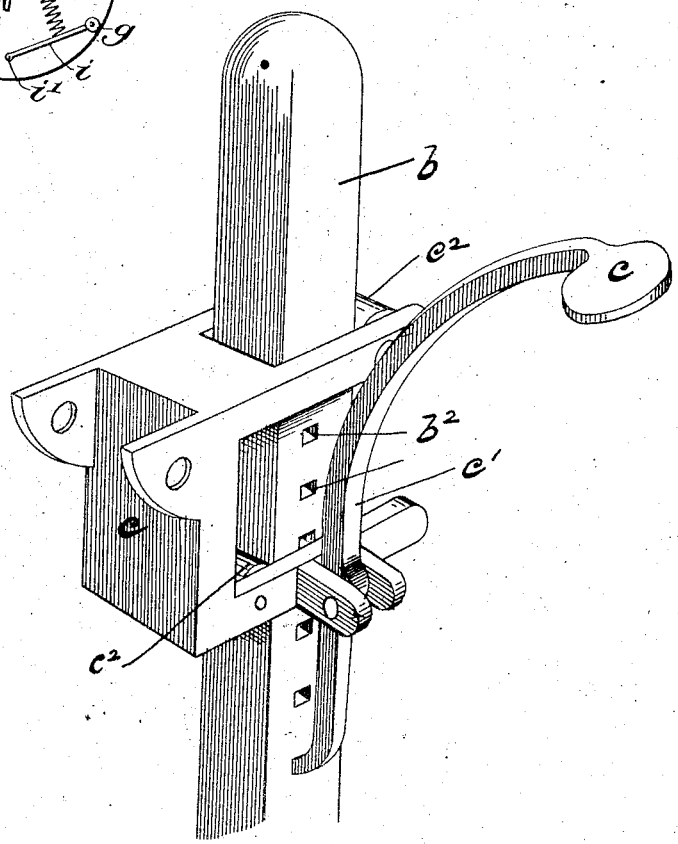
Witnesses.
Inventor
CHRISTOPHER S PADFIELD
By Vincent Hughes
Attorney

UNITED STATES PATENT OFFICE.

CHRISTOPHER SAMSON PADFIELD, OF HEMINGTON, NEAR BATH, ENGLAND.

APPARATUS FOR MECHANICALLY MILKING ANIMALS.

No. 833,890.　　　　Specification of Letters Patent.　　　　Patented Oct. 23, 1906.

Application filed September 10, 1903. Serial No. 172,621.

*To all whom it may concern:*

Be it known that I, CHRISTOPHER SAMSON PADFIELD, a subject of the King of Great Britain, residing at Hemington, near Bath, in the county of Somerset, England, have invented a new and useful Improvement in Apparatus for Mechanically Milking Animals, of which the following is a specification.

This invention relates to improvements in apparatus for mechanically milking animals, and has for its object to provide an apparatus of this class which is labor and time saving, effective in operation, and simple of construction, and which will not be liable to damage the animal during the operation of milking.

The invention consists, essentially, of an adjustable frame mounted upon a standard and carrying adjustable driven rollers and stationary compression-plates, between which the animal's teats are compressed for the purpose of extracting the milk.

Figure 1:
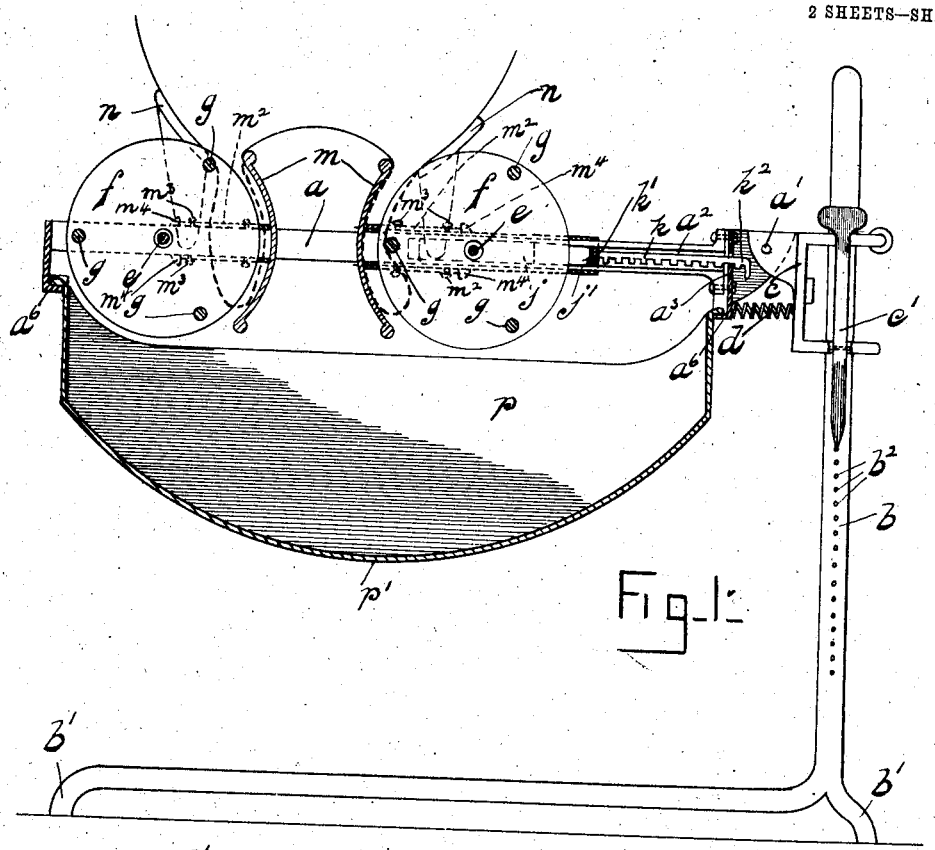
Figure 2:
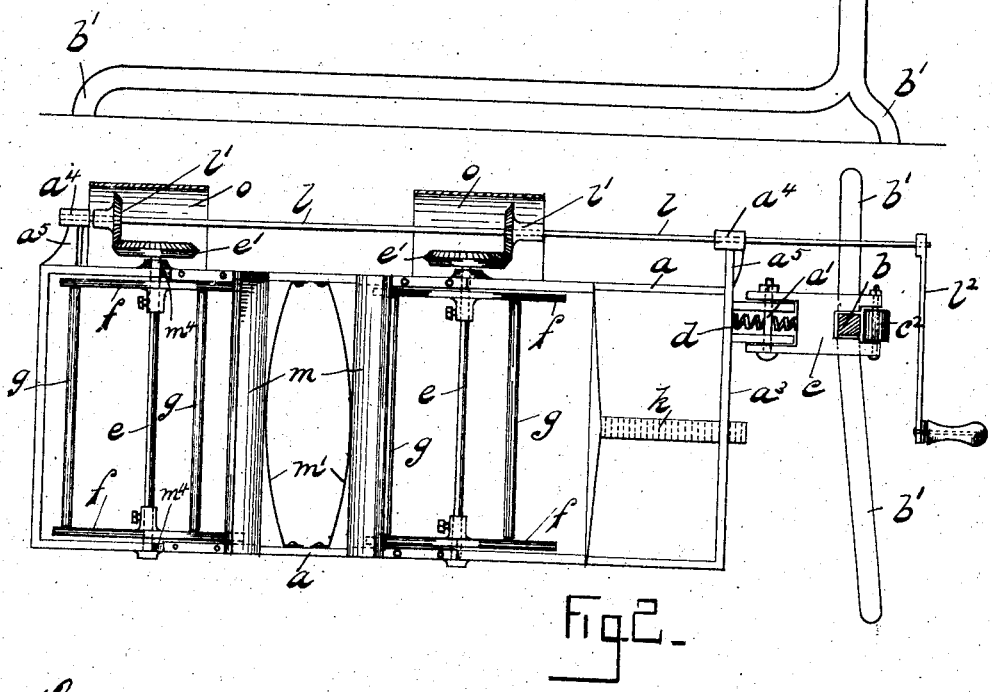

In the drawings accompanying and forming part of this specification, Figure 1 is a longitudinal vertical section of my apparatus; Fig. 2, a plan view thereof. Fig. 3 is a side elevational view illustrating the arrangement I employ for connecting the rollers to the end disks. Fig. 4 is an elevational view, partly in section, of a detail connected with the journaling of the rollers, while Fig. 5 is a perspective view of a detail connected with the vertical adjustment of the apparatus.

In carrying the invention into practice I provide a rectangular frame $a$, which is supported by a suitable standard, such as $b$, having feet $b'$. The frame $a$ is preferably hinged at $a'$ to a bracket $c$, arranged to have a vertical sliding movement on the standard $b$, a spring $d$ normally maintaining the said frame in its horizontal position. The object of this arrangement is to enable the frame to be depressed without the risk of bending any of the parts in the event of the animal "crumping" or crouching. The bracket $c$ is provided with a balanced pivoted catch $c'$, which is adapted to have its lower end take into any one of a number of holes $b^2$ in the standard $b$ to hold the frame at any desired point of adjustment. The frame $a$ carries two transverse spindles $e$, upon each of which are rigidly mounted end disks $f$, between which are rotatably mounted a plurality of rollers $g$, covered with rubber or other yielding material. The said rollers may be arranged to have no movement other than their rotary movement aforesaid, Figs. 1 and 2, or they may be mounted on springs or spring-controlled arms, so as to be capable of a compensating movement.

In the arrangement shown by Fig. 3 the rollers $g$ are mounted in bearings carried by the outer ends of curved springs $h$, which have their inner ends connected to blocks $h'$ on the inner sides of the end disks $f$, stops or projections $h^2$ being provided for limiting the outward movement of such spring-carried rollers.

The frame $a$ may be provided with lengthwise slots $a^2$ and one of the spindles $e$ mounted in bearing-blocks $j$, arranged to have a sliding adjustment in said slots, to provide for the adjustment of the one set of rollers $g$ nearer to or farther away from the other. This adjustment may be effected by means of a ratchet-bar $k$, hinged at one end $k'$ to a transverse connecting-piece $j'$, on the ends of the bearing-blocks $j$, and having at its other end a handle $k^2$, such ratchet-bar $k$ passing through an opening in the end member $a^3$ of the frame $a$. In lieu of this ratchet-bar a worm or other well-known equivalent may be employed.

Carried in bearings $a^4$, upon side extensions $a^5$ of the frame $a$, is a shaft $l$, upon which are keyed bevel-pinions $l'$, which gear with bevel-wheels $e'$, keyed upon one end of the spindles $e$ and by means of which the said spindles (and consequently the rollers $g$, carried by the disks $f$) are caused to be rotated in opposite directions. A crank-handle $l^2$ is provided on one end of the shaft $l$ to permit of same being manually actuated.

Curved compression-plates $m$, covered with rubber or its equivalent, are provided on the frame $a$, such plates being either rigid or they may be mounted on springs, such as $m'$, Figs. 1 and 2, such compression-plates being located intermediately of the roller-carrying disks $f$ and arranged to exert a pressure, in conjunction with the rollers $g$, against the animal's teats when the said rollers are rotated. The said compression-plates may be rendered capable of a lengthwise adjustment on the frame $a$ by providing the said plates with side flanges $m^2$, which extend across the upper and lower sides of the frame to support such plates thereupon and allow them to be moved along same. The compression-plates may be held at the desired point of adjustment by means of set-screws $m^3$ or their equivalent. Stops $m^4$ are provided for limiting the travel of the said compression-plates $m$.

Guards or supports $n$ are provided on the frame for the purpose of protecting and supporting the animal's udder, while the operating-gear and any other parts of the apparatus may be provided with safety-guards, such as $o$. For facilitating the removal of the rollers $g$ the spindles $g'$ at one end thereof may be each let into a recess $g^2$, in the bottom of which is provided a spring $g^3$, or any other suitable well-known arrangement may be provided for the stated purpose. Small antifriction-rollers $c^2$ are provided on the bracket $c$ to facilitate the movement of same upon the standard $b$. The frame $a$ is provided with depending ends $a^6$, having flanges $a^7$, for the purpose of enabling a milk-receiving pan $p$ to be suspended therefrom, the bottom $p'$ of such pan being given a curved form to prevent the milk being spilled in the event of the frame $a$ being turned down on its hinge.

The operation of the apparatus is as follows: The apparatus is placed beneath the cow, and the rollers and compression-plates adjusted so as to receive two teats between each plate and the corresponding rollers. By operating the shaft $l$ the spindles $e$ are caused to rotate in opposite directions, thereby causing the rollers $g$, mounted between the end disks $f$, carried by such rollers, to exert a downward rolling pressure against the teats, which, in conjunction with the said compression-plates $m$, causes the milk to be extracted and deposited into the receiving vessel, the arrangement of the spring-controlled rollers $g$ and compression-plates permitting of a compensating movement thereof in order to prevent undue pressure upon the teats.

What I claim, and desire to secure by Letters Patent of the United States, is—

1. In milking apparatus, the vertical standard having supporting-feet and a series of openings to receive the nose of a catch; the catch and the rectangular frame adjustably supported upon said standard, said frame comprising lengthwise-slotted side members and end members having depending flanges, for supporting a milk-receptacle, substantially as specified.

2. In combination with a rectangular frame and a vertical standard; the bracket arranged to have a vertical adjustment upon said standard; antifriction-rollers on said bracket; the pivoted weighted catch on said bracket, arranged to have its lower end take into any one of a number of openings in said standard; and the spring-controlled hinge connecting said frame with the said bracket, substantially as specified.

3. In milking apparatus, the combination with a vertically-adjustable frame; of transverse spindles, one of which is capable of a lengthwise adjustment in said lengthwise slots of the frame; end disks rigidly fixed to said spindles; yielding-surfaced rollers rotatably mounted between said end disks; and the means for driving said spindles and their accessories, said means comprising a shaft mounted in bearings in said frame; bevel-pinions on said shaft and bevel-wheels on said spindles, arranged to engage with said bevel-pinions on the shaft, substantially as specified.

4. In milking apparatus, the end disks rigidly connected to the driven transverse spindles, the frame in which are mounted said spindles; the means for driving said spindles; and the means for mounting the compression-rollers in said disks whereby a compensating movement is obtained, said means comprising spring-controlled arms pivoted at one end to said disks and having the roller ends revolubly mounted in their outer ends, substantially as specified.

5. In milking apparatus, the modified means of mounting the compression-rollers in the end disks, said means consisting of curved springs fixed at their inner ends to blocks on said disks, and having the roller ends revolubly mounted in bearings at their outer ends, substantially as specified.

6. The apparatus for mechanically milking cows, consisting of the combination of a hinged, rectangular frame adjustably supported upon a vertical standard; the standard; depending flanges on the ends of said frame; and a receiving vessel having a curved bottom and suspended from said flanges; with a pair of transverse spindles revolubly mounted in said frame; end disks on said spindles; curved compression-plates located between said sets of rollers; bevel-wheels on said spindles; a shaft rotatably mounted in said frame; bevel-pinions on said shaft, gearing with said bevel-wheels on the spindles and arranged to drive them in opposite directions; means for adjusting one of the spindles and its accessories lengthwise of the frame; and the guards for preventing contact of the animal with the mechanism, said guards being located on the hinged frame on each side of the said compression-plates, substantially as specified.

7. In milking apparatus, the modified form of supporting-standard, consisting of a flat-bottomed vessel arranged to form a milk-receptacle and a base for the standard supporting the apparatus; and the guards for preventing splashing or wasting of the milk as it is extracted from the animal, substantially as specified.

In testimony whereof I have signed my name to this specification in the presence of two subscribing witnesses.

CHRISTOPHER SAMSON PADFIELD.

Witnesses:
   GEO. CARTER,
   CHARLES HAMBLIN.